3,682,872
PERFLUORO(3-PHENOXYPROPYL VINYL ETHER) MONOMER AND COPOLYMERS MADE THEREFROM
Donald F. Brizzolara and Richard W. Quarles, Jr., Wilmington, Del., assignors to E. I. du Pont de Nemours and Company, Wilmington, Del.
No Drawing. Filed Mar. 18, 1970, Ser. No. 20,807
Int. Cl. C08f 15/40
U.S. Cl. 260—80.76
13 Claims

ABSTRACT OF THE DISCLOSURE

A novel perfluoro(3-phenoxypropyl vinyl ether) monomer and copolymers of said monomer with at least one fluorine containing ethylenically unsaturated comonomer, said copolymer containing about 0.2–3.0 mole percent of perfluoro(3-phenoxypropyl vinyl ether) units.

BACKGROUND OF THE INVENTION

Flourine-containing polymers ranging from low molecular weight oils to high molecular weight plastics are of outstanding industrial importance due to their exceptionally good thermal and chemical stability. With the advent of space technology there has arisen a critical need for materials capable of withstanding elevated temperatures in highly oxidative atmospheres. The fluorine-containing polymers of the prior art have not been found entirely satisfactory for these requirements and there has been a need for a fluorine-containing polymer exhibiting improved oxidative stability at high temperatures. A variety of fluorinated monomers has been developed in an attempt to produce copolymers having the desired resistance to environmental attack. However, the fluorinated monomers of the prior art have not proven entirely satisfactory. For example, attempts to form copolymers of the octafluorovinyl phenyl ether monomer disclosed by Wall and Pummer in U.S. Pat. 3,192,190 with other fluorine-containing monomers have proven unsuccessful and completely fluorinated copolymers prepared with perfluoro alkyl perfluorovinyl ethers disclosed in U.S. Pat. 3,132,123 to Harris and McCane have proven difficult to cure by conventional methods. Thus there is a need for fluorinated monomers which are readily copolymerizable with other fluorine-containing monomers to produce polymers exhibiting improved oxidative stability.

THE INVENTION

In accordance with this invention, there is provided a novel perfluoro(3-phenoxypropyl vinyl ether) monomer of the formula:

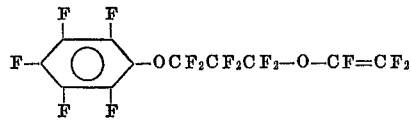

Also provided in accordance with this invention is a novel copolymer composition, having improved oxidative stability at elevated temperatures, which consists essentially of a copolymer of perfluoro(3-phenoxypropyl vinyl ether) with at least one fluorine containing ethylenically unsaturated comonomer, said copolymer containing about 0.2–3.0 mole percent perfluoro(3-phenoxypropyl vinyl ether) units.

The perfluoro(3-phenoxypropyl vinyl ether) monomer of this invention is prepared by pyrolysis at about 200–300° C. of perfluoro-2-(3-phenoxypropoxy)propionyl fluoride said propionyl fluoride being prepared by (1) preparing an alkali metal salt of perfluoro-3-phenoxy propionic acid by heating an alkali metal salt of pentafluorophenol with tetrafluoroethylene and carbon dioxide in an anhydrous, polar, aprotic solvent at 50–200° C. under autogenous pressure, (2) converting the alkali metal salt to the propionyl fluoride by conventional methods, (3) reacting the propionyl fluoride with hexafluoropropylene oxide and (4) pyrolyzing the resulting product. A detailed description of the preparation of the perfluoro(3-phenoxypropyl vinyl ether) monomer is given hereinafter.

The perfluoro(3-phenoxypropyl vinyl ether) monomer can be polymerized with a variety of ethylenically unsaturated comonomers. Fluorine containing monomers are employed to produce chemically inert fluorocarbon plastics and elastomers which can subsequently be crosslinked. Vulcanization can be accomplished by conventional methods known in the art, such as, for example, amine-based vulcanization. Suitable fluorine-containing comonomers are polyfluoro ethylenically unsaturated monomers containing about 2–10 carbon atoms.

The term "polyfluoro ethylenically unsaturated comonomer" as used herein refers to a monomer containing at least about N–2 fluorine atoms, where N is the number of substituent (non-carbon) atoms in the monomer.

Typical fluorine containing comonomers useful in this invention include, for example, vinylidene fluoride, trifluoroethylene, chlorotrifluoroethylene, tetrafluoroethylene, 1,1,3,3,3-pentafluoro-1-propene, 1,2,3,3,3-pentafluoro-1-propene, hexafluoropropylene, and perfluoroalkyl perfluorovinyl ethers, containing about 3 to 10 carbon atoms.

Preferably the copolymers of this invention contain about 0.5–3.0 mole percent perfluoro(3-phenoxypropyl vinyl ether) units.

Preferred fluorine-containing comonomers are completely fluorinated monomers such as tetrafluoroethylene, hexafluoropropylene and perfluoroalkyl perfluorovinyl ethers, preferably containing from about 3 to 8 carbon atoms, as described in U.S. Pat. 3,180,895 to Harris and McCane. Preferred copolymers are terpolymers of perfluoro(3 - phenoxypropyl vinyl ether)/perfluoromethyl perfluorovinyl ether/tetrafluoroethylene, preferably wherein the mole percent of the respective monomer units in the terpolymer is about 0.2–3.0/30–40/70–60.

In preparing the copolymers of this invention about one mole of perfluoro(3 - phenoxypropyl vinyl ether) is contacted with about 30–500 moles of the fluorine-containing ethylenic comonomer(s). A wide variety of conventional copolymerization methods can be employed to prepare the copolymers of this invention. A preferred method of copolymerization employs aqueous media and free-radical initiators such as $S_2O_8^=$, for example, at slightly elevated temperatures, e.g., 40–100° C. and pressures of about 200–600 p.s.i. Reduction activators such as bisulfite ion may conveniently be employed in conjunction with the free-radical initiator. It is also desirable to employ a perfluoro carbon surfactant such as ammonium perfluoro octanoate.

Continuous or batch polymerization processes may be employed. Vulcanization of the copolymers of this invention is effected by conventional methods such as amine-based curing.

The amine-based vulcanization of fluorinated polymers is well known to those skilled in the art. Frequently used are the organic aliphatic diamines, e.g., ethylene diamine or hexamethylene diamine, or their carbamates. Although spoken of as amine-based curing, the amines may be used as carbamates, hydrochlorides, oxalates, or reaction products with hydroquinone. Many amine-based systems have been devised to produce special effects using primary, secondary and tertiary amines, aliphatic and aromatic, alone or in combination with other amines. Hydrazine and its derivatives have also been used in such systems.

Amine-based vulcanizations are the subject of many patents, e.g., West, U.S. 2,793,200; Rugg, U.S. 2,933,481; West, U.S. 2,979,490; Smith, U.S. 3,008,619; Griffin, U.S. 3,041,316; and Davis et al. U.S. 3,071,565.

Vulcanization of the copolymers of the present invention can also be effected by poly(nucleophiles) in a basic system used in conjunction with a vulcanization accelerator which is a cyclic polyether consisting of about 4 to 10 —O—X— units and —O—Y— units wherein X and Y are dvalent radicals independently selected from the group consisting of:

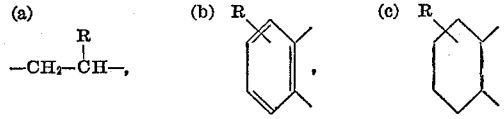

wherein R is hydrogen or methyl and wherein at least one of X and Y is $a$.

Representative poly(nucleophiles) are bis-(nucleophiles) such as 2,2 - bis(4-phenylol)propane, 2,2-bis(4-phenylol)perfluoropropane, resorcinol, 1,7 - dihydroxynaphthalene, 4,4' - dihydroxydiphenyl, 4,4'-dihydroxystilbene, 2,6 - dihydroxyanthracene, hydroquinone, or their alkali or alkaline earth metal salts; lower aliphatic diols, e.g., 1,3-propanediol and 1,6-hexanediol; dithiols, such as p-xylylydithiol; various weakly basic aromatic diamines like methylenedianiline, o-, m- and p-phenylenediamine; and bis-hydrazinium oxalate. Other polynucleophiles include pentaerythritol, diphenylsilanediol, 1,3,5-trihydroxybenzene and aminophenol. The various nucleophilic groups need not be the same.

For a more detailed description of vulcanization with poly(nucleophiles) see French Pat. No. 1,577,005 to Barney and Honsberg.

The following examples illustrate the invention. All parts, percentages and proportions are by weight unless otherwise indicated.

PREPARATION OF PERFLUORO (3-PHENOXYPROPYL VINYL ETHER) MONOMER (a) Synthesis of $C_6F_5OCF_2CF_2CO_2K$ Into a 3-neck 5 l. round bottom flask, equipped as above, was placed 3 pounds (9.9 moles) $K_2CO_3$ and approximately 3 l. $CH_3CN$. To this was added a solution of 1 kg. (5.44 moles) $C_6F_5OH$ dissolved in approximately 1 l. $CH_3CN$. The reaction mixture was heated to reflux for 24 hours, cooled to room temperature, and allowed to stand overnight. The solution was decanted from the precipitate and the remaining suspension filtered and then washed with $CH_3CN$. From the solution, 16–200 ml. aliquots were made, plus 2–200 ml. aliquots of wash solution. These 200 ml. aliquots were placed in a 400 ml. stainless steel shaker tube, the tube was pressured with 50 g. (0.5 mole) tetrafluoroethylene and 50 g. (1.15 mole) $CO_2$ and heated at 100° C. for 3½ hours. After venting the shaker tube, the cake of product was dried in a vacuum oven at 80° C. overnight. The yield from three such runs was 308 g., corresponding to an 83% yield if the runs from the washings are ignored.

(b) Synthesis of $C_6F_5OCF_2CF_2COCl$

Into a 3-neck 1 l. round bottom flask, equipped with mechanical stirrer and reflux condenser, were placed 203 g. (555 mmoles) $C_6F_5OCF_2CF_2CO_2K$, 200–300 ml. $CH_3CN$, and 35 ml. (58.6 g., 382 mmoles) $POCl_3$. The stirred suspension was heated to reflux overnight. After cooling to room temperature, the mixture was filtered, and the precipitate washed twice with $CH_3CN$. The solution and washings were combined and distilled. The fraction boiling at 181° C. was $C_6F_5OCF_2CF_2COCl$ and weighed 153.3 g.

When the filtration apparatus was washed, a second phase, more dense than water, was noticed. It was refluxed overnight with an excess of $SOCl_2$ and a few drops of pyridine, and yielded a further 21.6 of $$C_6F_5OCF_2CF_2COCl$$

The overall yield was 174.9 g. (91%).

(c) Synthesis of $C_6F_5OCF_2CF_2COF$

One pound of NaF (10.8 moles) and 300 ml. tetramethylene sulfone were placed into a 4-neck round bottom flask equipped with dropping funnel, mechanical stirrer, thermometer, and reflux condenser cooled with water. The top of the reflux condenser was connected to a cold finger condenser, cooled with an ice-acetone mixture, on top of a 500 ml. 2-neck flask immersed in a bath maintained at —80, the second neck on the flask being connected to the vacuum system. Into the dropping funnel was placed 550 g. (1.59 moles)

$$C_6F_5OCF_2CF_2COCl$$

The pressure was lowered to 3 mm. Hg, the reaction pot heated to between 80° C. and 100° C. The $$C_6F_5OCF_2CF_2COCl$$

was added dropwise. After all of the acid chloride was added, the pot was heated to 120° C. to remove all product. The material collected in the receiver was redistilled, B.P. 49° C./11 mm. Hg. The yield of $$C_6F_5OCF_2CF_2COF$$

was 441.1 g. (84.5% based on $C_6F_5OCF_2CF_2COCl$).

(d) Synthesis of $C_6F_5OCF_2CF_2CF_2OCF(CF_3)COF$

Into a 1 l. round bottom flask, equipped with stirrer and gas inlet, was placed 18 g. (118 mmoles) CsF, 100 ml. tetraethyleneglycol dimethyl ether, and 220 g. (667 mmoles) $C_6F_5OCF_2CF_2COF$. The flask and its contents were cooled to —80° C. and evacuated. After warming to 33–36° C., 128 g. (772 mmoles) hexafluoropropyleneoxide was added with stirring over one hour. The layers were separated. Distillation of the lower layer yielded a small amount of $CF_3CF_2CF_2OCF(CF_3)CFO$, B.P. 55° C., 70 g. (212 mmoles) $C_6F_5OCF_2CF_2CFO$, B.P. 49°/11 mm. Hg, and 92.8 g. (187 mmoles)

$$C_6F_5OCF_2CF_2CF_2OCF(CF_3)CFO$$

B.P. 77–78°/11 mm. Hg (39% yield, based on 150 g. $C_6F_5OCF_2CF_2CFO$ used up).

(e) Synthesis of $C_6F_5OCF_2CF_2CF_2OCF=CF_2$

The pyrolysis of the precursor acid fluoride, $$C_6F_5OCF_2CF_2CF_2OCF(CF_3)COF$$

was carried out using a fluidized bed reactor packed with $Na_2CO_3$ which had been dried for two days at 300° C. under a nitrogen stream. The sodium carbonate used was Diamond Chemical Company's Light Soda Ash, 58% $Na_2O$.

The bed was thermostatted between 270–300° C. and 604 g. (1.21 moles) of $$C_6F_5OCF_2CF_2CF_2OCF(CF_3)CFO$$

fed by means of a syringe pump at a rate of 1 cc./min. Conversion was essentially 100%, and a yield of 453.5 g. (89%) of $C_6F_5OCF_2CF_2CF_2OCF=CF_2$ obtained (B.P. 84°/20 mm. Hg).

All the foregoing reactions were carried out under an inert atmosphere and in such a fashion as to exclude moisture.

EXAMPLE 1

Polymerizations were carried out in a one-gallon stainless steel autoclave equipped with a thermocouple, cooling (or heating) coil, a three blade mechanically driven stirrer, and a vent fitted with a safety rupture disc. The autoclave is charged with 1900 ml. of a buffer and dispersant solution made up as follows: 15 g. ammonium perfluorooctanoate, 13.6 $Na_2HPO_4 \cdot 7H_2O$, 0.75 g. $NaH_2PO_4 \cdot H_2O$, and 1900 ml. distilled water.

Catalyst solutions were made up as follows:

Catalyst A—20 g. $(NH_4)_2S_2O_8$ in 1000 ml. distilled water.

Catalyst B—9 g. $Na_2SO_3$, 180 ml. 0.04 wt. percent aqueous $CuSO_4 \cdot 5H_2O$, dissolved in 720 ml. distilled water.

The perfluoro(3-phenoxypropyl vinyl ether) monomer, was made up as a 20 volume percent solution in $CCl_2FCF_2Cl$.

After charging the autoclave as above, 2 g. ammonium persulfate, $(NH_4)_2S_2O_8$, was added and the autoclave closed. The temperature was brought to 40° C. while the system was purged of air by monomer feed. Teterafluoroethylene, hereinafter referred to as TFE and perfluoromethyl perfluorovinyl ether, hereinafter referred to as $P_fMVE$ were added continuously, at rates of 122 g./hr. and 332 g./hr., respectively. Five minutes after the TFE and $P_fMVE$ feeds were started, 30 ml. of catalyst B was added and the perfluoro(3-phenoxypropyl vinyl ether) monomer solution feed started, at a rate of 20 ml./hr. Every 15 minutes thereafter, 5 ml. catalyst B was added. After 90 ml. catalyst B had been added, 5 ml. catalyst A was added each time catalyst B was added.

After 2000–2200 g. monomers had been fed, feeds were shut off, the reactor cooled to room temperature, vented and dumped. The resulting latex was isolated by coagulation with 3 weight percent $MgCl_2$ in distilled water. The polymer was washed four times with 50 volume percent ethanol in water, air dried and finally dried on a rubber mill at 70° C.

The polymer thus isolated had an inherent viscosity of 0.82 dl./g., measured as 0.2 weight percent solution in dichlorooctafluorobutane containing 1 weight percent diethyleneglycol dimethyl ether. Infra-red analysis indicated a composition of 33.8 mole percent $P_fMVE$ units and 1.0 mole percent $C_6F_5OCF_2CF_2CF_2OCF=CF_2$ units.

EXAMPLE 2

The polymer of Example 1 and a sample of polymer prepared under the same conditions but with perfluoro(2-phenoxypropyl vinyl ether) as the cure site monomer [33 mole percent $P_fMVE$ units, 0.5 mole percent perfluoro(2-phenoxypropyl vinyl ether) units] were compounded and cured as follows:

| | A | B[1] |
|---|---|---|
| TFE/$P_fMVE$/perfluoro(3-phenoxypropyl vinyl ether) | 300 | |
| TFE/$P_fMVE$/perfluoro(2-phenoxypropyl vinyl ether) | | 300 |
| Medium thermal carbon black | 30 | 30 |
| Magnesium oxide | 12 | 12 |
| Dicyclohexyl-18-crown-6 | 12 | 12 |
| KO–⟨◯⟩–C(CF₃)₂–⟨◯⟩–OK | 9 | 9 |

[1] Polymer B is outside the scope of this invention and is provided for comparison.

NOTE.—Press cured for 30 minutes/177° C. Post cured: Under $N_2$ atmosphere. 4 hrs. to 300° F., 24 hrs. at 300° F., 24 hrs. at 350° F., 24 hrs. at 400° F., 6 hrs. to 572° F., and 24 hrs. at 572° F.

Dicyclohexyl-18-Crown-6 is a compound having the following structural formula:

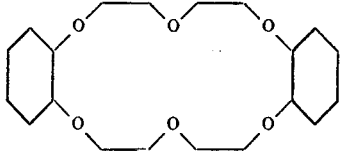

A process for the preparation of this compound is found in JACS 89, 7017 (1967).

Polymer samples were cut up into small dumbbells and their mechanical properties were measured on a tensile tester after heat aging for the indicated time in a circulating air oven at 500° F. Modulus at 100% elongation, tensile at break and elongation at break are determined in accordance with the standard method of tension testing of the American Society for Testing and Materials (ASTM), which method has the ASTM designation of D412–68. The results are given below.

| | A | B[1] |
|---|---|---|
| After post cure: | | |
| $M_{100}$ (modulus at 100% elongation, avg. of 2) | 1,450 | 2,710 |
| $T_B$ (tensile strength at break, avg. of 2) | 3,760 | 3,880 |
| $E_B$ (elongation at break, avg. of 2) | 170 | 125 |
| P.S. (percent permanent tensile set, avg. of 2) | 16.5 | 10 |
| Aged 6 days: | | |
| $M_{100}$ | 2,675 | 2,225 |
| $T_B$ | 3,550 | 3,610 |
| $E_B$ | 120 | 140 |
| P.S. | 12 | 12 |
| Aged 14 days: | | |
| $M_{100}$ | 2,140 | 1,350 |
| $T_B$ | 3,870 | 4,130 |
| $E_B$ | 130 | 170 |
| P.S. | 15.5 | 15 |
| Aged 21 days: | | |
| $M_{100}$ | 1,675 | 1,210 |
| $T_B$ | 3,835 | 3,445 |
| $E_B$ | 165 | 180 |
| P.S. | 17 | 16 |
| Aged 28 days: | | |
| $M_{100}$ | 1,815 | 1,370 |
| $T_B$ | 4,190 | 4,085 |
| $E_B$ | 150 | 180 |
| P.S. | 19 | 23 |
| Aged 42 days: | | |
| $M_{100}$ | 2,035 | 1,620 |
| $T_B$ | 4,860 | 3,980 |
| $E_B$ | 170 | 180 |
| P.S. | 20 | 20 |
| Aged 63 days: | | |
| $M_{100}$ | 1,020 | 850 |
| $T_B$ | 3,680 | 3,610 |
| $E_B$ | 213 | 270 |
| P.S. | 30 | 35.5 |
| Aged 105 days: | | |
| $M_{100}$ | 640 | 480 |
| $T_B$ | 2,380 | 930 |
| $E_B$ | 300 | 470 |
| P.S. | 54 | 108 |

[1] Polymer B is outside the scope of this invention and is provided for comparison.

EXAMPLE 3

The polymer of Example 1 and a polymer prepared with perfluoro(2-phenoxypropyl vinyl ether) monomer [36 mole percent $P_fMVE$ units, 0.89 mole percent perfluoro(2-phenoxypropyl vinyl ether) units] which was made in several runs exactly as in Example 1 (the products of the runs were blended together) were compounded and cured as follows:

| | A | B[1] |
|---|---|---|
| TFE/$P_fMVE$/perfluoro(3-phenoxypropyl vinyl ether) | 200 | |
| TFE/$P_fMVE$/perfluoro(2-phenoxypropyl vinyl ether) | | 200 |
| Medium thermal carbon black | 30 | 30 |
| Magnesium oxide | 4 | 4 |
| Dicyclohexyl-18-crown-6 | 6 | 6 |
| KO–⟨◯⟩–C(CF₃)–⟨◯⟩–OK | 6 | 6 |

[1] Polymer B is outside the scope of this invention and is provided for comparison.

NOTE.—Press cure: ½ hour at 180° C. Post cure: As in Example 2.

The slabs were heat aged in a circulating air oven at 550° C. for the indicated times and then pulled on a tensile tester. The results are given below:

| | A | B[1] |
|---|---|---|
| After post cure: | | |
| $M_{100}$ | | |
| $T_B$ | 3,000 | 1,750 |
| $E_B$ | 80 | 80 |
| P.S. | 10 | 5 |
| Aged 4 days: | | |
| $M_{100}$ | 2,750 | 1,000 |
| $T_B$ | 2,950 | 1,550 |
| $E_B$ | 100 | 160 |
| P.S. | 11 | 10 |
| Aged 7 days: | | |
| $M_{100}$ | 2,250 | 850 |
| $T_B$ | 3,375 | 1,500 |
| $E_B$ | 135 | 190 |
| P.S. | 11 | 130 |
| Aged 10 days: | | |
| $M_{100}$ | 2,250 | 750 |
| $T_B$ | 2,900 | 950 |
| $E_B$ | 140 | 200 |
| P.S. | 14 | 21 |
| Aged 14 days: | | |
| $M_{100}$ | 1,400 | 400 |
| $T_B$ | 2,750 | 350 |
| $E_B$ | 200 | 220 |
| P.S. | 36 | 380 |
| Aged 18 days: | | |
| $M_{100}$ | 1,450 | (2) |
| $T_B$ | 2,675 | (2) |
| $E_B$ | 220 | (2) |
| P.S. | 38 | (2) |
| Aged 21 days: | | |
| $M_{100}$ | 1,150 | (2) |
| $E_B$ | 2,175 | (2) |
| $T_B$ | 260 | (2) |
| P.S. | 60 | (2) |
| Aged 28 days: | | |
| $M_{100}$ | 750 | (2) |
| $T_B$ | 1,050 | (2) |
| $E_B$ | 355 | (2) |
| P.S. | 87 | (2) |

[1] Polymer B is outside the scope of this invention and is provided for comparison.
[2] Discontinued.

The examples clearly show the superiority of the copolymers prepared with perfluoro(3 - phenoxypropyl vinyl ether) as compared to the copolymers prepared with perfluoro(2 - phenoxypropyl vinyl ether). The superiority lies in the area of thermal oxidative stability of the vulcanizates. Vulcanizates of copolymers prepared with perfluoro(3-phenoxypropyl vinyl ether) retain useful tensile properties longer under a given set of conditions than vulcanizates of copolymers prepared with perfluoro(2-phenoxypropyl vinyl ether). Example 2 clearly shows the superiority of the copolymers of this invention in that the vulcanizate of Polymer A has a tensile strength of 2380 p.s.i. after 105 days of heat-aging while comparison of Polymer B has a tensile strength of only 930 p.s.i. Example 3 quite dramatically demonstrates the superiority of the copolymers of this invention in that Polymer B has deteriorated to the point of uselessness at 18 days heat aging, while Polymer A retains a tensile strength of 1000 p.s.i. after 28 days heat aging.

We claim:

1. A novel perfluoro(3 - phenoxypropyl vinyl ether) monomer of the formula

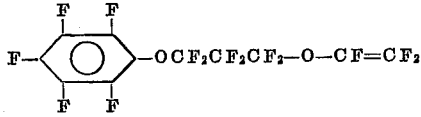

2. A copolymer of perfluoro(3-phenoxypropyl vinyl ether) with at least one polyfluoro ethylenically mono unsaturated $C_2$–$C_{10}$ comonomer, said copolymer containing about 0.2–3.0 mole percent perfluoro(3-phenoxypropyl vinyl ether) units.

3. A copolymer of claim 2 containing about 0.5–3.0 mole percent perfluoro(3 - phenoxypropyl vinyl ether) units.

4. A copolymer of claim 2 wherein the comonomer is perfluorinated.

5. A copolymer of claim 2 wherein the fluorine-containing ethylenically unsaturated monomer is at least one of the following: tetrafluoroethylene, vinylidene fluoride, hexafluoropropylene and perfluoroalkyl perfluorovinyl ethers of from about 3 to 8 carbon atoms.

6. A copolymer of claim 2 which is a terpolymer of perfluoro(3-phenoxypropyl vinyl ether)/perfluoromethyl perfluorovinyl ether/tetrafluoroethylene.

7. A copolymer of claim 6 wherein the mole percent of the respective monomer units in the terpolymer is about 0.2–3.0/30–40/70–60.

8. A cured copolymer of claim 2.
9. A cured copolymer of claim 3.
10. A cured copolymer of claim 4.
11. A cured copolymer of claim 5.
12. A cured copolymer of claim 6.
13. A cured copolymer of claim 7.

References Cited

UNITED STATES PATENTS 3,467,638   9/1969   Pattison   260—87.5

JOSEPH L. SCHOFEE, Primary Examiner

S. M. LEVIN, Assistant Examiner

U.S. Cl. X.R.

260—41 C, 47 UP, 87.5 A, 87.7, 531, 544 Y, 613 D, 900